United States Patent
Ichimiya (10) Patent No.: US 8,971,697 B2
(45) Date of Patent: Mar. 3, 2015

(54) FOCUS DETECTION APPARATUS AND FOCUS DETECTION METHOD

(75) Inventor: Takashi Ichimiya, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/981,714

(22) Filed: Dec. 30, 2010

(65) Prior Publication Data
US 2011/0176794 A1 Jul. 21, 2011

(30) Foreign Application Priority Data
Jan. 21, 2010 (JP) .................................. 2010-011373

(51) Int. Cl.
| | | |
|---|---|---|
| G03B 3/00 | (2006.01) | |
| G03B 13/34 | (2006.01) | |
| H04N 5/232 | (2006.01) | |
| G02B 7/28 | (2006.01) | |
| G03B 13/36 | (2006.01) | |
| H04N 5/355 | (2011.01) | |
| H04N 5/378 | (2011.01) | |
| H04N 5/3745 | (2011.01) | |

(52) U.S. Cl.
CPC ............ *G03B 13/36* (2013.01); *H04N 5/23212* (2013.01); *H04N 5/35554* (2013.01); *H04N 5/378* (2013.01); *G02B 7/28* (2013.01); *H04N 5/37452* (2013.01)
USPC ............................................. 396/96; 396/123

(58) Field of Classification Search
USPC .................................................. 396/96, 123
See application file for complete search history.

(56) References Cited

U.S. PATENT DOCUMENTS

| | | | |
|---|---|---|---|
| 6,088,536 A * | 7/2000 | Nakahara et al. | 396/80 |
| 6,694,097 B2 | 2/2004 | Tsunemiya et al. | |
| 2006/0177210 A1* | 8/2006 | Ichimiya | 396/96 |

FOREIGN PATENT DOCUMENTS

| | | |
|---|---|---|
| CN | 1818735 A | 8/2006 |
| JP | 2003-215442 | 7/2003 |
| JP | 2006-220684 A | 8/2006 |

OTHER PUBLICATIONS

Oct. 23, 2012 Chinese Office Action, with English Translation, that issued in Chinese Patent Application No. 201110024991.3.
Jan. 6, 2014 Japanese Office Action, without English Translation, that issued in Japanese Patent Application No. 2010-011373.

* cited by examiner

*Primary Examiner* — Clayton E LaBalle
*Assistant Examiner* — Noam Reisner
(74) *Attorney, Agent, or Firm* — Cowan, Liebowitz & Latman, P.C.

(57) ABSTRACT

A focus detection apparatus comprises: a photoelectric converter including a pair of line sensors to output electrical signals; a selection unit constructed to select one of focus detection points; a control unit constructed to divide the pair of line sensors into a plurality of pairs of blocks in accordance with different divisional patterns which make the resultant plurality of pairs of blocks respectively corresponding to the focus detection points, and read out electrical signals from each pair of blocks when the levels of the electrical signals of the pair of blocks reach a level suitable for focus detection; frame memories, constructed to store the read out electrical signals, corresponding to the divisional patterns; and a focus detection unit constructed to detect a focus state of an imaging lens, on the basis of a phase difference between electrical signals of the pair of blocks corresponding to the selected focus detection point.

10 Claims, 10 Drawing Sheets

FOCUS DETECTION APPARATUS AND FOCUS DETECTION METHOD

BACKGROUND OF THE INVENTION

1. Field of the Invention

The present invention relates to a focus detection apparatus and focus detection method for use in an image capturing apparatus such as a camera.

2. Description of the Related Art

Conventionally, a phase-difference detection method is commonly known as a focus detection method for use in an automatic focus detection apparatus of a camera. The phase-difference detection method refers to a method of forming, onto a pair of line sensors, an image of light fluxes from an object, which have passed through different exit pupil regions of an imaging lens, and obtaining the phase difference between a pair of electrical signals of an image of the object, obtained by photoelectric conversion, thereby detecting the defocus amount of the imaging lens.

In addition, a technique for a multipoint focus detection apparatus is also disclosed, in which a line sensor is divided into a plurality of blocks to control signal charge accumulation for each block, and the detection of the defocus amount is carried out from a plurality of images of an object corresponding to the positions of the respective blocks (for example, see Japanese Patent Laid-Open No. 2003-215442).

However, in the focus detection apparatus described in Japanese Patent Laid-Open No. 2003-215442, each block has a short range of field. The shorter range of field may result in the inability to capture the contrast of an object sufficiently, thus leading to a problem of reduction in focus detection accuracy. In addition, the shorter range of field limits the detectable defocus range, thus causing the problem of inability to control focus detection for a significantly defocused image of an object.

SUMMARY OF THE INVENTION

The present invention has been made in consideration of the above situation, and allows a reduction in the accuracy of focus detection to be avoided in a focus detection apparatus that has the function of dividing a line sensor into a plurality of blocks and controlling charge accumulation for each block.

According to one aspect of the present invention, there is provided a focus detection apparatus for detecting a focus state of an imaging lens, on the basis of a phase difference between a pair of light fluxes from an object, which have passed through different exit pupil regions of the imaging lens, the focus detection apparatus comprising: a photoelectric converter constructed to photoelectrically convert a pair of light fluxes from the object through at least one pair of line sensors to output electrical signals; a selection unit constructed to select any of a plurality of predetermined focus detection points; a control unit constructed to divide the at least one pair of line sensors into a plurality of pairs of blocks in accordance with a plurality of different divisional patterns which make the resultant plurality of pairs of blocks respectively corresponding to the plurality of focus detection points, and exercise control for each of the pairs of divided blocks in such a way that electrical signals are read out when the levels of the electrical signals of the pair of blocks reach a level suitable for focus detection; a plurality of frame memories constructed to store electrical signals read out for each of the pairs of blocks, the plurality of frame memories each corresponding to the plurality of divisional patterns; and a focus detection unit constructed to detect a focus state of the imaging lens, on the basis of a phase difference between electrical signals of the pair of blocks corresponding to the focus detection point selected by the selection unit, among electrical signals stored in the plurality of frame memories.

According to another aspect of the present invention, there is provided a focus detection apparatus for detecting a focus state of an imaging lens, on the basis of a phase difference between a pair of light fluxes from an object, which have passed through different exit pupil regions of the imaging lens, the focus detection apparatus comprising: a photoelectric converter constructed to photoelectrically convert a pair of light fluxes from the object through at least one pair of line sensors to output electrical signals; a selection unit constructed to select any of a plurality of predetermined focus detection points; a control unit constructed to divide the at least one pair of line sensors into a plurality of pairs of blocks in accordance with a plurality of different divisional patterns which make the resultant plurality of pairs of blocks corresponding to any of the plurality of focus detection points, and exercise control for each of the pairs of divided blocks in such a way that electrical signals are read out when the levels of the electrical signals of the pair of blocks reach a level suitable for focus detection; a plurality of frame memories constructed to store electrical signals read out for each of the pairs of blocks, the plurality of frame memories each corresponding to the plurality of divisional patterns; a generation unit constructed to generate electrical signals for one line sensor from the electrical signals read out from a plurality of blocks obtained by dividing same line sensors in accordance with the plurality of divisional patterns, among the electrical signals stored in the plurality of frame memories, and set, from the generated electrical signals, a range of electrical signals corresponding to focus detection points other than the plurality of focus detection points, which do not correspond to the plurality of pairs of blocks; and a focus detection unit for detecting a focus state of the imaging lens, on the basis of a phase difference between electrical signals of the pair of blocks or in the range corresponding to the focus detection point selected by the selection unit.

According to still another aspect of the present invention, there is provided a focus detection method for detecting a focus state of an imaging lens, on the basis of a phase difference between a pair of light fluxes from an object, which have passed through different exit pupil regions of the imaging lens, the focus detection method comprising: a photoelectric conversion step of photoelectrically converting a pair of light fluxes from the object through at least one pair of line sensors to output electrical signals; a selection step of selecting any of a plurality of predetermined focus detection points; a control step of dividing the at least one pair of line sensors into a plurality of pairs of blocks in accordance with a plurality of different divisional patterns which make the resultant plurality of pairs of blocks respectively corresponding to the plurality of focus detection points, and exercising control for each of the pairs of divided blocks in such a way that electrical signals are read out when the levels of the electrical signals of the pair of blocks reach a level suitable for focus detection; a storage step of storing electrical signals read out for each of the pairs of blocks in a plurality of frame memories each corresponding to the plurality of divisional patterns; and a focus detection step of detecting a focus state of the imaging lens, on the basis of a phase difference between electrical signals of the pair of blocks corresponding to the focus detection point selected in the selection step, among electrical signals stored in the plurality of frame memories.

According to yet another aspect of the present invention, there is provided a focus detection method for detecting a focus state of an imaging lens, on the basis of a phase difference between a pair of light fluxes from an object, which have passed through different exit pupil regions of the imaging lens, the focus detection method comprising: a photoelectric conversion step of photoelectrically converting a pair of light fluxes from the object through at least one pair of line sensors to output electrical signals; a selection step of selecting any of a plurality of predetermined focus detection points; a control step of dividing the at least one pair of line sensors into a plurality of pairs of blocks in accordance with a plurality of different divisional patterns which make the resultant plurality of pairs of blocks corresponding to any of the plurality of focus detection points, and exercising control for each of the pairs of divided blocks in such a way that electrical signals are read out when the levels of the electrical signals of the pair of blocks reach a level suitable for focus detection; a storage step of storing electrical signals read out for each of the pairs of blocks in a plurality of frame memories each corresponding to the plurality of divisional patterns; a generation step of generating electrical signals for one line sensor from the electrical signals read out from a plurality of blocks obtained by dividing same line sensors in accordance with the plurality of divisional patterns, among the electrical signals stored in the plurality of frame memories, and setting, from the generated electrical signals, a range of electrical signals corresponding to focus detection points other than the plurality of focus detection points, which do not correspond to the plurality of pairs of blocks; and a focus detection step of detecting a focus state of the imaging lens, on the basis of a phase difference between electrical signals of the pair of blocks or in the range corresponding to the focus detection point selected in the selection step.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

First Embodiment

Figure 1:
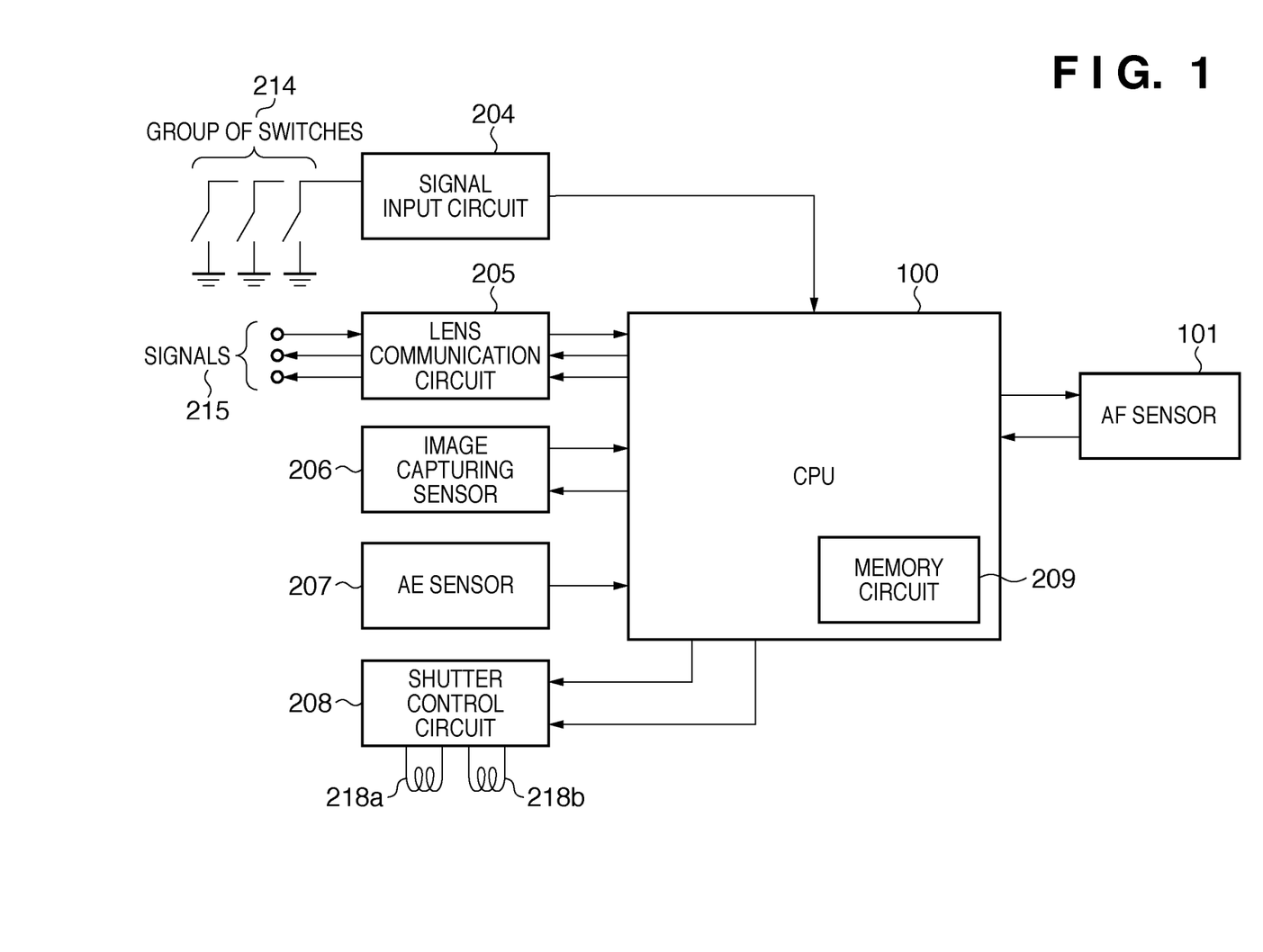
FIG. 1 is a block diagram illustrating the configuration of a camera body according to a first embodiment.

FIG. 1 is a block diagram illustrating the configuration of a camera body according to a first embodiment of the present invention, and in the first embodiment, the camera body is intended for use with a removable imaging lens (not shown) attached. As a matter of course, the present invention is not to be considered limited to this camera, it comes near to stating the obvious that the present invention may be directed to a camera integrated with an imaging lens.

In FIG. 1, reference numeral 100 denotes a microcomputer (hereinafter, referred to as a "CPU") for a camera. The CPU 100 has a memory circuit 209 built-in, such as a ROM storing a program for controlling the camera operation, a RAM for storing variants, and an EEPROM (electrically erasable programmable read-only memory) for storing various types of parameters.

To the CPU 100, a signal input circuit 204, a lens communication circuit 205, an image capturing sensor 206, an AE sensor 207, a shutter control circuit 208, and an AF sensor 101 are connected. Reference numeral 214 denotes a group of operation switches, and the operation of the camera body is set by operating this group of switches 214. The signal input circuit 204 senses signals from the group of operation switches 214, and transmits the sensed signals to the CPU 100. The shutter control circuit 208 controls shutter magnets 218a and 218b. In addition, signals 215 are transmitted to and from the imaging lens, not shown, through the lens communication circuit 205 to control the in-focus position and the aperture.

The CPU 100 controls the AE sensor 207 to detect the luminance of an object, and determines the aperture value of the imaging lens, not shown, and shutter speed. Then, the CPU 100 controls the aperture through the lens communication circuit 205, and controls the current-carrying time for the magnets 218a and 218b through the shutter control circuit 208 to control the shutter speed. The CPU 100 further controls the image capturing sensor 206 to carry out a shooting operation.

The AF sensor 101 includes a pair of groups of line sensors, and the CPU 100 controls the AF sensor 101 to detect the defocus amount on the basis of the contrast distribution of electrical signals of an object, obtained from the pair of groups of line sensors. Then, on the basis of the detected defocus amount, the CPU 101 controls the in-focus position of the imaging lens, not shown. It is to be noted that as the focus detection method in the first embodiment, the well known phase-difference detection method is used which is able to detect the focus states of multiple different focus detection points in a shooting screen as will be described later.

Next, the relationship between groups of line sensors in the AF sensor 101 and focus detection points in a shooting screen will be described with reference to FIGS. 2 through 4B.

Figure 2:
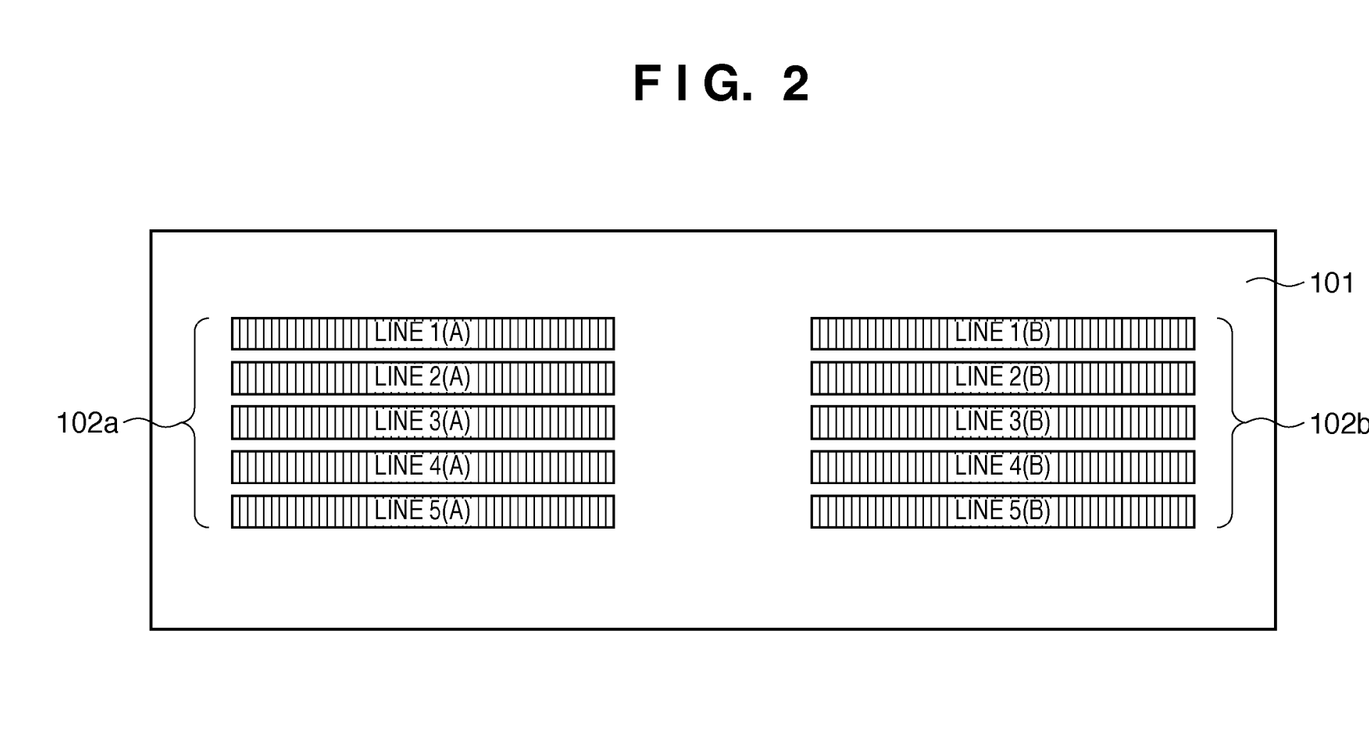
FIG. 2 is a diagram of an arrangement of line sensors in an AF sensor according to the first embodiment.

FIG. 2 is a diagram of an arrangement of groups of line sensors in the AF sensor 101. The group of line sensors 102a has 5 line sensors arranged in a direction orthogonal to the line direction, in which a plurality of pixels is linearly arranged. In addition, the group of line sensors 102b also has a plurality of line sensors arranged in the same way. The groups of line sensors 102a and 102b respectively receive light fluxes from an object, which have passed through different exit pupil regions of the imaging lens.

Figure 3:
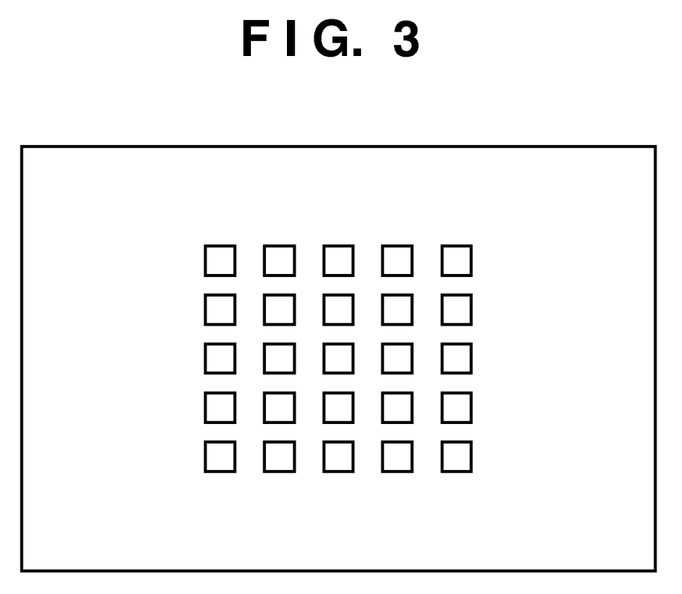
FIG. 3 is a diagram of an arrangement of focus detection points in the first embodiment.
Figure 4A:
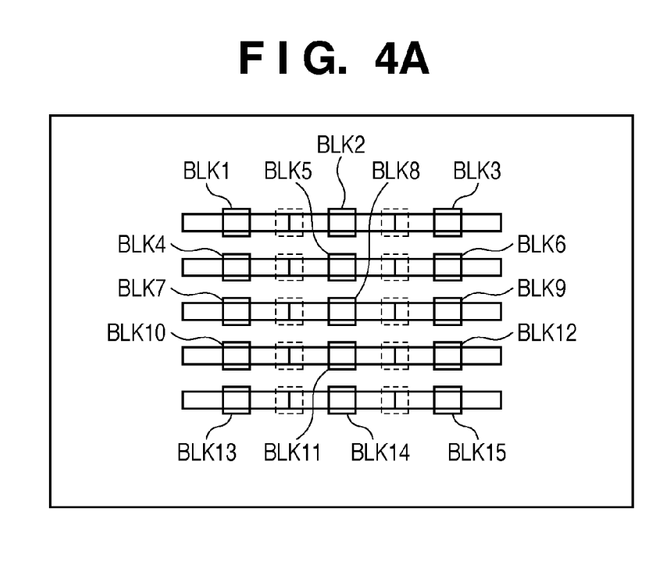
FIGS. 4A and 4B are diagrams illustrating the positional relationship between focus detection points and blocks obtained by dividing line sensors in the first embodiment.
Figure 4B:
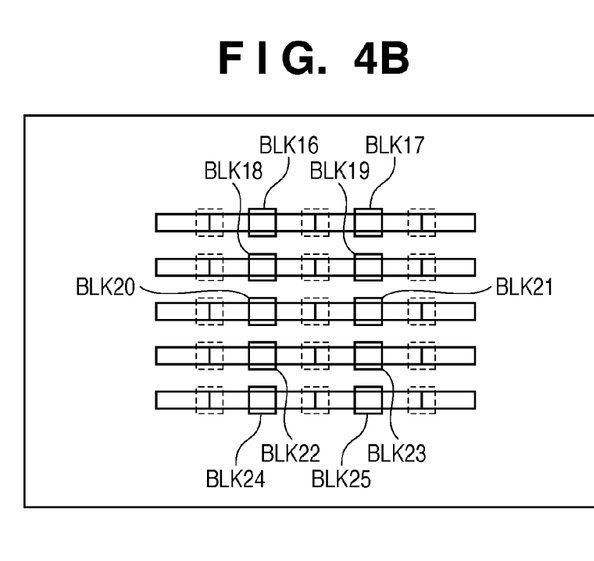

FIG. 3 is a diagram illustrating an arrangement of focus detection points in a shooting screen, in which 25 focus detection points in total of 5 rows×5 columns are arranged according to the first embodiment. FIG. 4A and FIG. 4B are diagrams for explaining the division of the groups of line sensors 102a and 102b into blocks, for the purpose of arranging the focus detection points shown in FIG. 3.

FIG. 4A is a diagram illustrating the positional relationship between each block and the focus detection point in the case of dividing each of the lines 1 to lines 5 of the groups of line sensors 102a and 102b into 3 blocks. The groups of line sensors 102a and 102b are each divided into 15 blocks of blocks BLK 1 to BLK 15, and the focus states can be detected from signals for each pair of blocks to correspond to 15 points of the 25 focus detection points shown in FIG. 3. This state is referred to as a first divisional pattern. The focus detection points indicated by a dashed line are located on the boundaries between the blocks, and thus, the focus states for these focus detection points are not able to be detected in the first divisional pattern.

Therefore, in the first embodiment, the groups of line sensors 102a and 102b are divided into blocks in a different way from in the first divisional pattern, so as to correspond to the focus detection points on the dotted line in FIG. 4A. FIG. 4B is a diagram illustrating the positional relationship between each block and the focus detection point in the case of dividing each of the lines 1 to lines 5 of the groups of line sensors 102a and 102b into 4 blocks. The two outer blocks are not used for the detection of the focus states because the blocks are small in length, while only the two blocks near the center are used for the detection. Accordingly, the groups of line sensors 102a and 102b are each divided into 10 blocks of blocks BLK 16 to BLK 25, and the focus states can be detected from signals for each pair of blocks to correspond to 10 points of the 25 focus detection points shown in FIG. 3. This state is referred to as a second divisional pattern.

The combination of the first divisional pattern of FIG. 4A with the second divisional pattern of FIG. 4B allows the focus states to be detected for all of the 25 focus detection points shown in FIG. 3.

Figure 5:
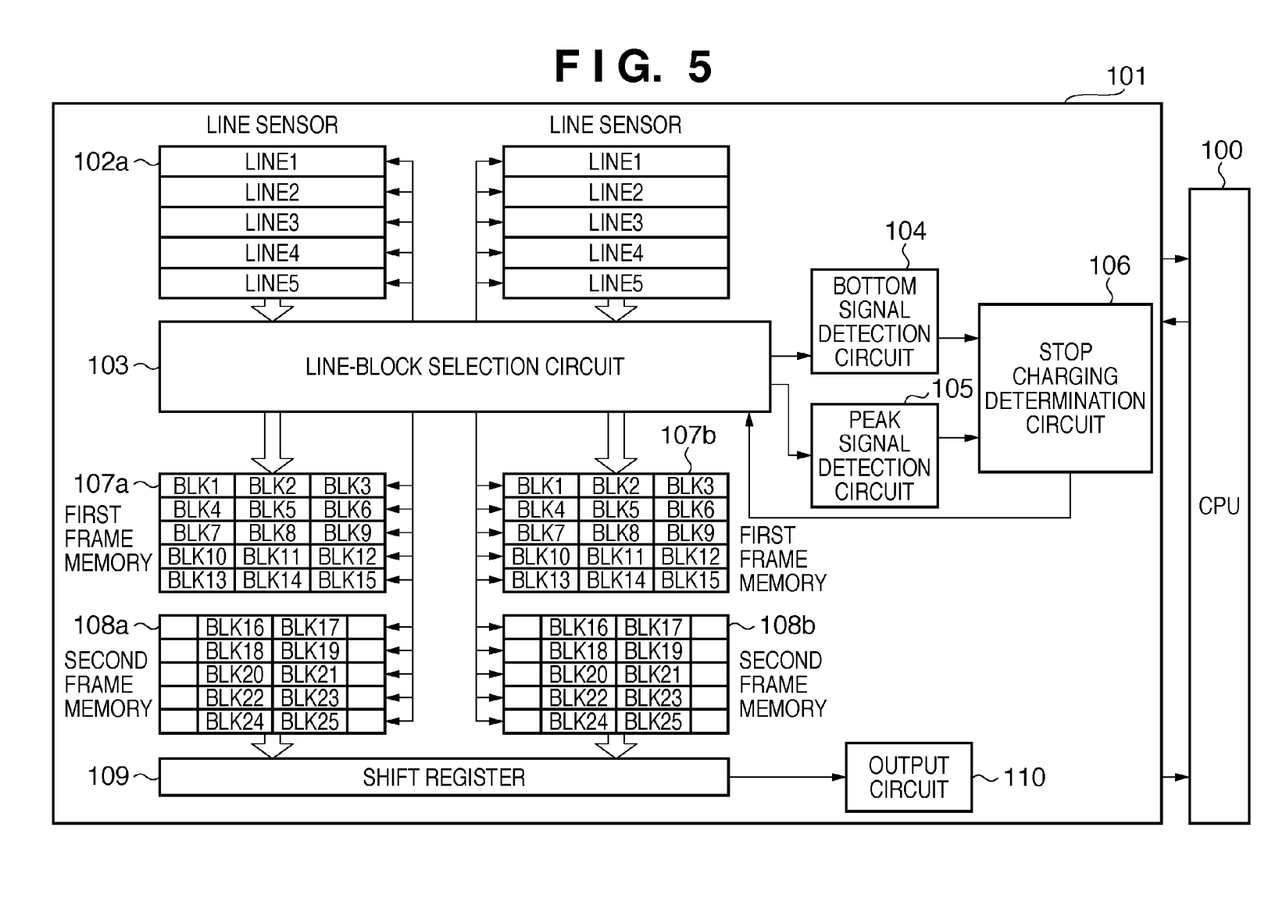
FIG. 5 is a block diagram illustrating the configuration of the AF sensor according to the first embodiment.

FIG. 5 is a block diagram illustrating the detailed configuration of the AF sensor 101. The operation will be described below for each configuration of the AF sensor 101.

The groups of line sensors 102a and 102b respectively receive light fluxes from an object, which have passed through different exit pupil regions of the imaging lens, and accumulate signals converted to voltages by photoelectric conversion. A line-block selection circuit 103 selects one of the multiple pairs of lines of the groups of line sensors 102a and 102b, and divides the selected lines into a plurality of blocks. The divisional pattern is the first divisional pattern shown in FIG. 4A or the second divisional pattern shown in FIG. 4B. Then, the line-block selection circuit 103 transmits pixel signals (electrical signals) accumulated in groups of pixels corresponding to each pair of blocks to a bottom signal detection circuit 104, a peak signal detection circuit 105, first frame memories 107a and 107b, and second frame memories 108a and 108b.

The bottom signal detection circuit 104 detects the minimum signal (bottom signal) among the pixel signals of the pair of blocks selected by the line-block selection circuit 103. The peak signal detection circuit 105 detects the maximum signal (peak signal) among the pixel signals of the pair of blocks selected by the line-block selection circuit 103. The stop charging determination circuit 106 determines, on the basis of the detected peak signal and bottom signal, whether or not the pixel signals of the pair of blocks have levels suitable for the focus detection, thereby determining the stop charging timing, and transmits the determination result to the line-block selection circuit 103. In this case, the stop charging is determined, for example, when the difference between the peak signal and the bottom signal is greater than a predetermined value, or when the bottom signals both exceed a predetermined value.

The line-block selection circuit 103 executes stop charging for the corresponding blocks, on the basis of the transmitted determination result. It is to be noted that the "stop charging" herein refers to the operation of storing pixel signals for the corresponding blocks in the first frame memories 107a and 107b or the second frame memories 108a and 108b, rather than actually stopping charge accumulation in the pixels in the corresponding blocks.

The first frame memories 107a and 107b are respectively circuits for storing signals of the groups of line sensors 102a and 102b, which store signals corresponding to the blocks BLK 1 to BLK 15 in the first divisional pattern.

The second frame memories 108a and 108b are respectively circuits for storing signals of the groups of line sensors 102a and 102b, which store signals corresponding to the blocks BLK 16 to BLK 25 in the second divisional pattern.

The pixel signals stored in the first frame memories 107a and 107b and the second frame memories 108a and 108b are output for each pixel through an output circuit 110, when the CPU 100 drives a shift register circuit 109. The output circuit 110 carries out processing such as amplification of the pixel signals, and output the processed signals to an A/D converter (not shown) of the CPU 100.

Figure 6:
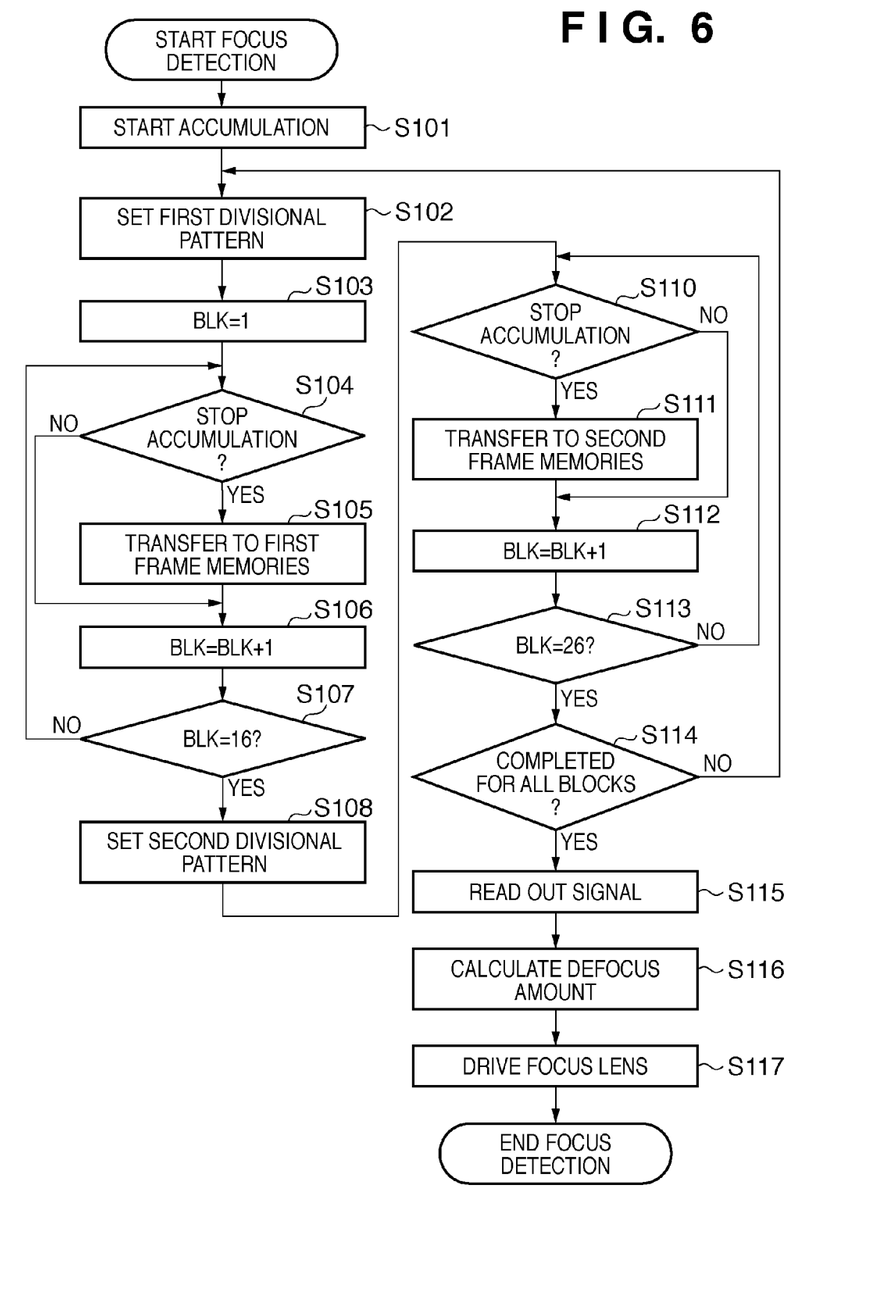
FIG. 6 is a flowchart showing a focus detection procedure according to the first embodiment.

The focus detection procedure in the camera including the focus detection apparatus configured as described above will be described in detail, with reference to a flowchart in FIG. 6.

The CPU 100, when receiving a start signal for focus detection through manipulation of the group of switches 214, controls the AF sensor 101 to start the operation of signal charge accumulation in the groups of line sensors 102a and 102b (step S101).

In step S102, the AF sensor 101 sets the first divisional pattern of blocks to be selected by the line-block selection circuit 103. In subsequent step S103, the AF sensor 101 sets "1" as a block number to be selected by the line-block selection circuit 103.

Then, the line-block selection circuit 103 transmits pixel signals obtained from the pair of blocks with the set block number, to the bottom signal detection circuit 104 and the peak signal detection circuit 105. From the bottom signal and the peak signal obtained from the bottom signal detection circuit 104 and the peak signal detection circuit 105, the stop charging determination circuit 106 determines, for each pair of blocks, whether or not the signal levels are at levels suitable for the focus detection, thereby making a stop charging determination (step S104). If the stop charging determination circuit 106 determines stop charging, the procedure proceeds to step S105. On the other hand, if the stop charging is not determined, or if the pair of blocks is already in stop charging, the procedure proceeds to step S106.

In step S105, the line-block selection circuit 103 transfers pixel signals in the blocks determined as for stop charging in step S104, to the first frame memories 107a and 107b. It is to be noted that as described above, the first frame memories 107a and 107b are memories for the pairs of blocks BLK 1 to BLK 15 in the first divisional pattern.

In step S106, the AF sensor 101 sets the block number by adding one more to the currently selected block number. In step S107, the AF sensor 101 determines whether the block number set is "16" or not. If the block number is "16", the procedure proceeds to the operation in step S108, because the stop charging determination in accordance with the first divisional pattern has gone through a cycle from the pair of blocks BLK 1 to the pair of blocks BLK 15.

On the other hand, in the case of the block number other than "16", that is, "2" to "15", the stop charging determination in accordance with the first divisional pattern has not gone through the cycle yet. Thus, the procedure returns to step S104, in which the operation for stop charging determination is carried out for the remaining pair(s) of blocks.

In step S108, the AF sensor 101 sets the second divisional pattern of blocks to be selected by the line-block selection circuit 103. The line-block selection circuit 103 transmits pixel signals obtained from the pair of blocks with the set block number, to the bottom signal detection circuit 104 and the peak signal detection circuit 105. From the bottom signal and the peak signal obtained from the bottom signal detection circuit 104 and the peak signal detection circuit 105, the stop charging determination circuit 106 determines, for each pair of blocks, whether or not the signal levels are at levels suitable for the focus detection, thereby making a stop charging determination (step S110). If the stop charging determination circuit 106 determines stop charging, the procedure proceeds to step S111. On the other hand, if the stop charging is not determined, or if the pair of blocks is already in stop charging, the procedure proceeds to step S112.

In step S111, the line-block selection circuit 103 transfers pixel signals obtained from the pair of blocks determined as for stop charging in step S114, to the second frame memories 108a and 108b. It is to be noted that as described above, the second frame memories 108a and 108b are memories for the pairs of blocks BLK 16 to BLK 25 in the second divisional pattern.

In step S112, the AF sensor 101 sets the block number by adding one more to the currently selected block number. In step S113, the AF sensor 101 determines whether the block number set is "26" or not. If the block number is "26", the procedure proceeds to the operation in step S114, because the stop charging determination in accordance with the second divisional pattern has gone through a cycle from the pair of blocks BLK 16 to the pair of blocks BLK 25.

On the other hand, in the case of the block number other than "26", the stop charging determination in accordance with the second divisional pattern has not gone through the cycle yet. Thus, the procedure returns to step S110, in which the operation for stop charging determination is carried out for the remaining pair(s) of blocks.

In step S114, the AF sensor 101 determines whether or not the operation for stop charging has been carried out for all of the blocks (BLK 1 to BLK 25). More specifically, in this step, it is determined whether or not the signal transfer has been completed to the first frame memories 107a and 107b and the second frame memories 108a and 108b.

If the operation for stop charging has been completed for all of the pairs of blocks, a completion signal is transmitted to the CPU 100. On the other hand, if there are any blocks that have not been in stop charging yet, the procedure returns to step S102, and the operations up to S114 are repeated. In this way, the control circuit in the AF sensor 101 carries out the signal charge accumulation operation, the stop charging operation, and the signal storage operation in steps S101 through S114.

In step S115, the CPU 100, which has received the completion signal from the AF sensor 101, carries out the operation of reading out pixel signals in each block. In this case, the CPU 100 controls the AF sensor 101 to sequentially output pixel signals stored in the first frame memories 107a and 107b and the second frame memories 108a and 108b, and applies A/D conversion to the pixel signals in the A/D converter, not shown, in the CPU 100. The pixel signals subjected to the A/D conversion are stored in the memory circuit 209.

In step S116, the CPU 100 detects a phase difference on the basis of the pixel signals for each pair of blocks, stored in the memory circuit 209, to calculate the defocus amount for an object located in each pair of blocks.

In step S117, the CPU 100 exercises drive control of a focus lens of the imaging lens, not shown, through the lens communication circuit 205, on the basis of the defocus amount calculated in step S116, and then ends the series of focus detection operations.

As described above, according to the first embodiment, the groups of line sensors 102a and 102b divided into blocks in accordance with the first divisional pattern and the second divisional pattern allows the number of focus detection points to be increased while lengthening the block of the line sensor corresponding to each focus detection point. Furthermore, the frame memories provided to correspond to each of the first divisional pattern and the second divisional pattern allow signals for the both divisional patterns to be obtained by the single signal charge accumulation operation, and thus allows the time for the focus detection to be prevented from being increased.

Second Embodiment

Next, a second embodiment of the present invention will be described. The AF sensor 101 in the first embodiment described above divides the groups of line sensors 102a and 102b in accordance with the first divisional pattern shown in FIG. 4A and the second divisional pattern shown in FIG. 4B. In the second embodiment, another example of divisional patterns will be described which are different from the first and second divisional patterns.

Figure 7A:
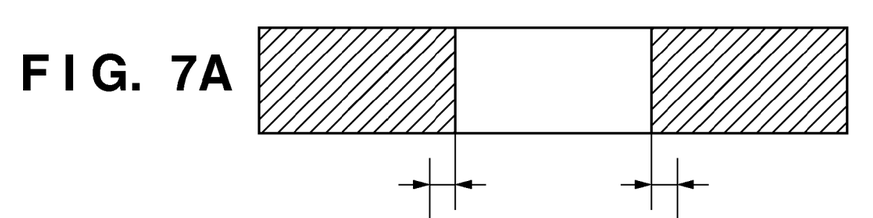
FIGS. 7A and 7B are diagrams illustrating divisional patterns for line sensors according to a second embodiment.
Figure 7B:
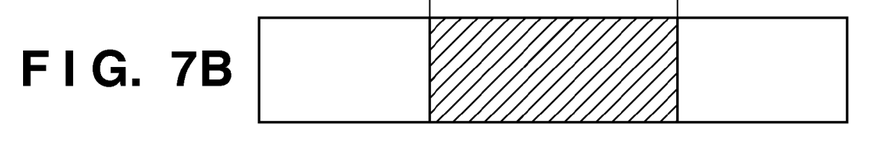

FIGS. 7A and 7B show divisional patterns in the second embodiment. FIG. 7A shows a third divisional pattern, in which each line sensor is divided into three, and only pixel signals from two blocks at either end are used for focus detection processing. In addition, FIG. 7B shows a fourth divisional pattern, in which each line sensor is divided into three, and only pixel signals from one central block are used for focus detection processing. It is to be noted that the third divisional pattern and the fourth divisional pattern have different block boundaries from each other, in which some pixels indicated by arrows are overlapped with each other, as shown in FIGS. 7A and 7B.

Figure 8:
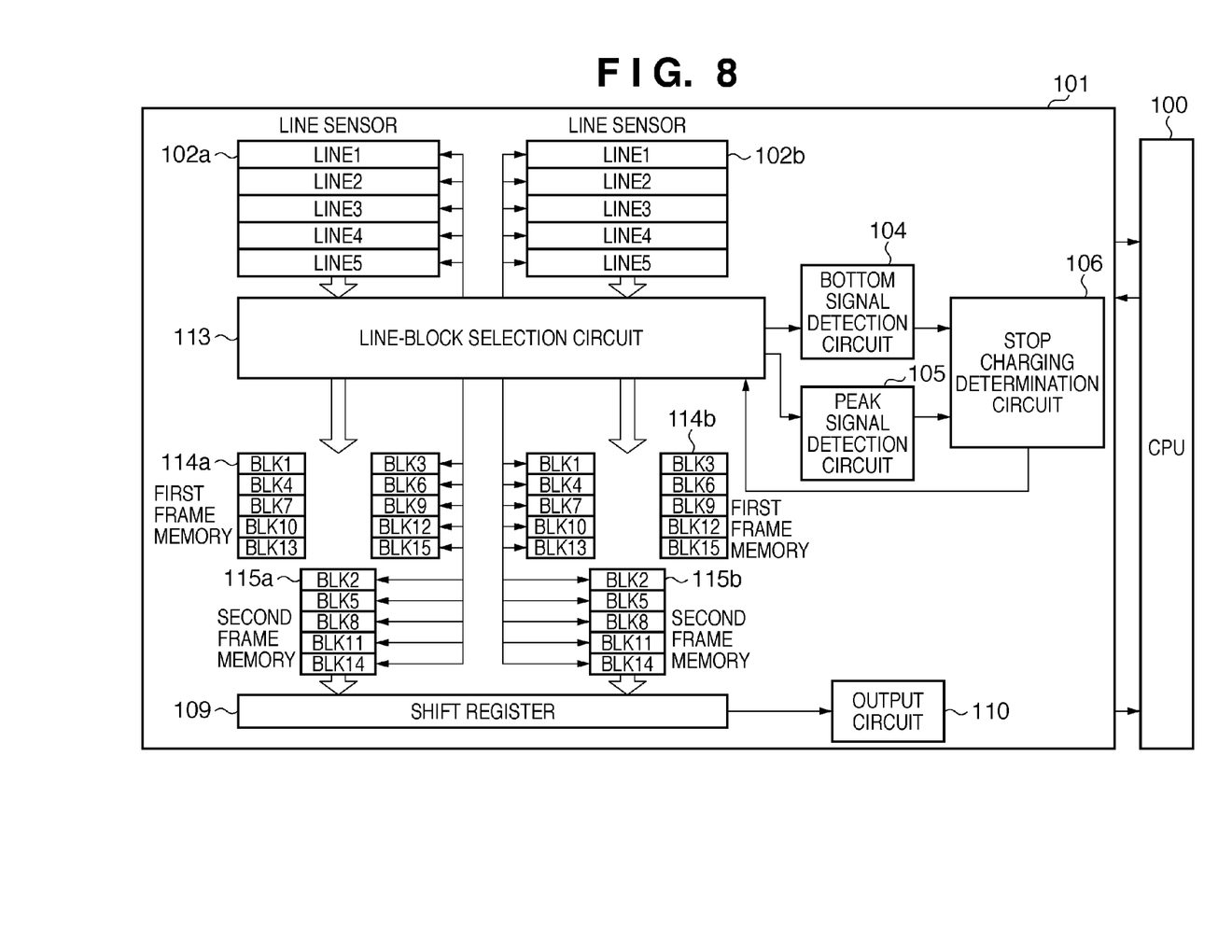
FIG. 8 is a block diagram illustrating the configuration of an AF sensor according to the second embodiment.

FIG. 8 is a block diagram illustrating the detailed configuration of an AF sensor 101 in the second embodiment. Components which are different from those in FIG. 5 are a line-block selection circuit 113, first frame memories 114a and 114b, and second frame memories 115a and 115b. In the second embodiment, what is different from the first embodiment is that pixel signals for two blocks in the third divisional pattern and for one block in the fourth divisional pattern are respectively stored in the first frame memories 114a and 114b and the second frame memories 115a and 115b. Since the other configuration is the same as that in FIG. 5, the same reference numbers are assigned thereto, and the description of the same configuration will be omitted.

Figure 9:
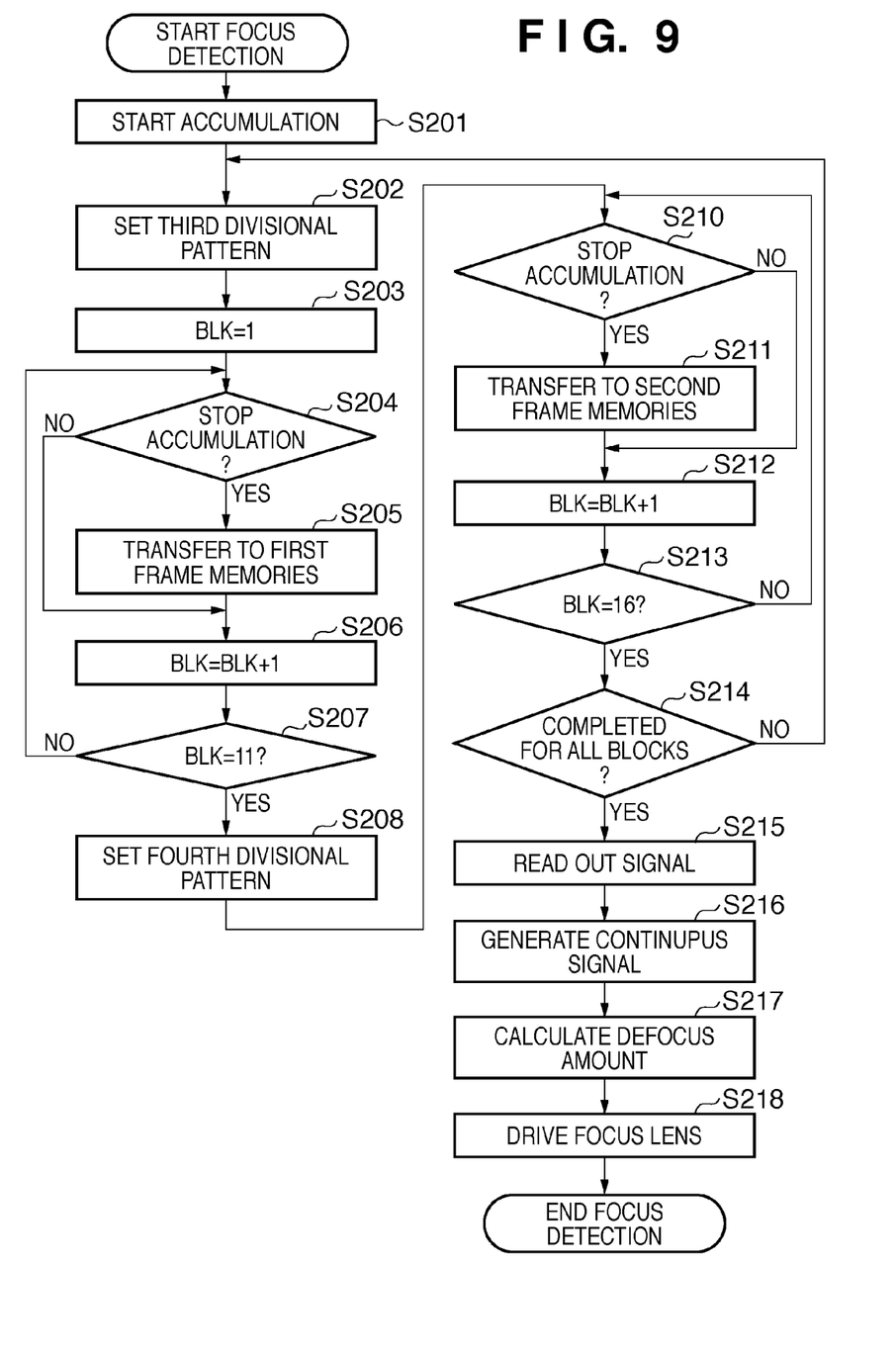
FIG. 9 is a flowchart showing a focus detection procedure according to the second embodiment.

FIG. 9 is a flowchart showing a focus detection procedure according to the second embodiment. It is to be noted that the description of the same processing as that in FIG. 6 will be omitted appropriately, and the processing different from the first embodiment will be described in detail. The processing up to step S215 is different in that the third divisional pattern is set in step S202 instead of setting the first divisional pattern in step S102 of FIG. 6, whereas the fourth divisional pattern is set in step S208 instead of setting the second divisional pattern in step S108 of FIG. 6. In addition, it is determined in step S207 whether the block number BLK is 11 (=2 blocks×5 line+1) or not, and it is determined in step S213 whether the block number BLK is 16 (=11+1 block×5 line) or not. Except for the differences described above, the procedure is the same as the procedure described with reference to FIG. 6.

Figure 10A:
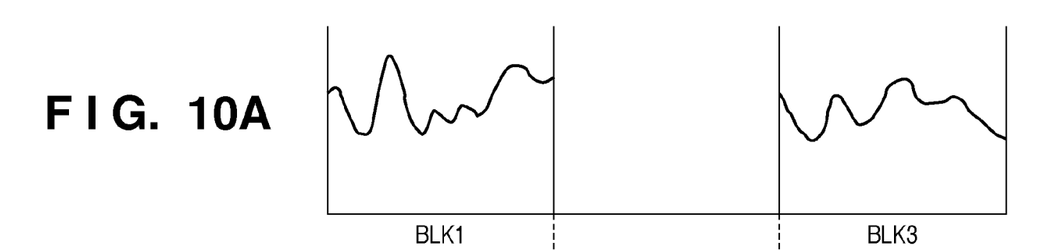
FIGS. 10A to 10C are diagrams for explaining the processing for generating a continuous signal in the second embodiment.
Figure 10B:
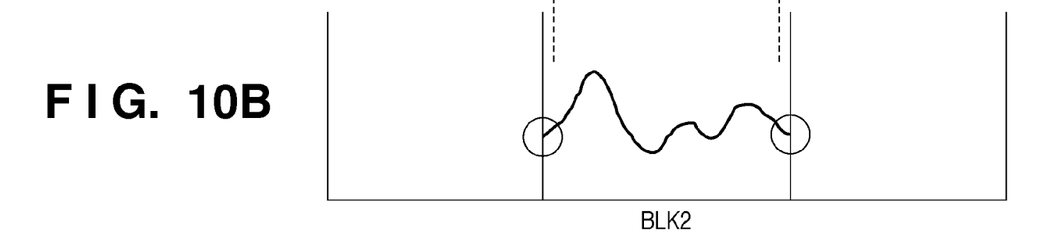
Figure 10C:
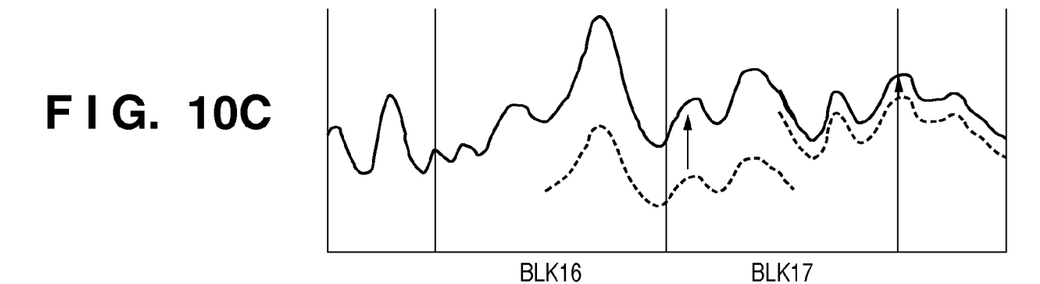

Then, from pixel signals for all of the pairs of blocks, stored in the memory circuit 209 in step S215, the generation of a continuous signal for one line sensor is carried out in step S216. FIGS. 10A to 10C are diagrams for explaining a method for generating a continuous signal.

FIG. 10A shows signals of blocks BLK 1 and BLK 3 stored in the first frame memory 114a, which are obtained by dividing a line 1(A) in FIG. 8 in accordance with the third divisional pattern. In addition, FIG. 10B shows signals of a block BLK 2 stored in the second frame memory 115a, which are obtained by dividing the same line 1(A) in accordance with the fourth divisional pattern. The signals of the respective blocks are discontinuous because of the difference in storage time. However, since some of the pixel signals of the block BLK 2 are overlapped with some of the pixel signals of the blocks BLK 1 and BLK 3, a coefficient is calculated such that the overlapped pixel signals can be converted to signals at the same level. Then, the same coefficient is also applied to the other pixel signals which are not overlapped with each other, for the purpose of making a level adjustment, thereby allowing a continuous signal for one line sensor to be generated as shown in FIG. 10C.

Then, the signals in the range centered at the boundary between the blocks BLK 1 and BLK 2 and the signals in the range centered at the boundary between the blocks BLK 2 and BLK 3 are stored in the memory circuit 209 respectively as BLK 16 and BLK 17. The same processing is applied to all of the lines to make it possible to correspond to the same focus detection points as shown in FIGS. 4A and 4B.

In step S217, the CPU 100 detects a phase difference on the basis of the pixel signals for each pair of blocks, stored in the memory circuit 209 in the way as described above, to calculate the defocus amount for an object located in each pair of blocks.

In step S218, the CPU 100 exercises drive control of a focus lens of the imaging lens, not shown, through the lens communication circuit 205, on the basis of the defocus amount calculated in step S217, and then ends the series of focus detection operations.

As described above, according to the second embodiment, the number of focus detection points can be increased while lengthening the block of the line sensor corresponding to each focus detection point similarly to the first embodiment. Furthermore, as compared with the first embodiment, the frame memories for storing pixel signals for each pair of blocks can be composed of smaller-capacity frame memories. Therefore, the chip area of the AF sensor can be reduced, and the cost can be thus reduced.

It is to be noted that the case in which the number of focus detection points is 25 and a pair of groups of line sensors is composed of 5 line sensors for each group has been explained by way of example in the first and second embodiments described above. However, the present invention is not to be considered limited by the number of focus detection points or line sensors, and can respond to various arrangements of focus detection points, depending on the number of line sensors and how to divide the line sensors into blocks.

In addition, while the case of two types of divisional patterns has been described for the pattern of division into blocks, three or more types of divisional patterns may be adopted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-011373, filed on Jan. 21, 2010 which is hereby incorporated by reference herein in its entirety.

What is claimed is:

1. A focus detection apparatus for detecting a focus state of an imaging lens comprising:
    a photoelectric converter configured to photoelectrically convert a pair of light fluxes from an object through a pair of line sensors to output electrical signals;
    a memory configured to store the electrical signals read out from the photoelectric converter;
    a control unit configured to sequentially monitor, while observing charge accumulation for, each pair of blocks in a plurality of pairs of blocks that are set by dividing the pair of line sensors in a first pattern, and to read out the electrical signals from the each pair of blocks to the memory on condition that the electrical signals suitable for focus state detection is observed, and to sequentially monitor, while observing charge accumulation for, each pair of blocks in a plurality of pairs of blocks that are set by dividing the pair of line sensors in a second pattern, and to read out the electrical signals from the each pair of blocks to the memory on condition that the electrical signals suitable for focus state detection is observed, wherein the monitoring of the plurality of pairs of blocks in the first pattern and the monitoring of the plurality of pairs of blocks in the second pattern are alternately repeated, and wherein the blocks in the second pattern includes boundaries of the blocks in the first pattern and the blocks in the first pattern includes boundaries of the blocks in the second pattern; and
    a focus detection unit configured to detect a focus state of the imaging lens on the object with each pairs of blocks as a focus detection point, on the basis of a phase difference between electrical signals of the pairs of the divided blocks stored in the memory.

2. The focus detection apparatus according to claim 1, wherein the control unit determines that levels of the electrical signals of each pair of the divided blocks reach a level suitable for focus detection, when the difference between a maximum signal and a minimum signal of electrical signals of each pair of the divided blocks is greater than a predetermined value, and when the minimum signal is greater than a predetermined value.

3. The focus detection apparatus according to claim 1 further comprising
    a generation unit configured to generate electrical signals for one of the pair of line sensors from the electrical signals read out from the divided blocks of the one line sensor in the first and second patterns and stored in the memory.

4. The focus detection apparatus according to claim 3, wherein the control unit determines that levels of the electrical signals of each pair of the divided blocks reach a level suitable for focus detection, when the difference between a maximum signal and a minimum signal of electrical signals of each pair of the divided blocks is greater than a predetermined value, and when the minimum signal is greater than a predetermined value.

5. The focus detection apparatus according to claim 3, wherein the first and second patterns have different divisional boundaries from each other between the first and second patterns.

6. The focus detection apparatus according to claim 5, wherein the generation unit makes a level adjustment so that the levels of electrical signals, output from a region of blocks partially overlapped with each other by providing the different divisional boundaries, reach the same level, and then generates electrical signals for one line sensor.

7. A focus detection method for detecting a focus state of an imaging lens comprising:
   a photoelectric conversion step of photoelectrically converting a pair of light fluxes from object through a pair of line sensors to output electrical signals;
   a control step of sequentially monitoring, while observing charge accumulation for, each pair of blocks in a plurality of pairs of blocks that are set by dividing the pair of line sensors in a first pattern, and reading out the electrical signals from the each pair of blocks to a memory on condition that the electrical signals suitable for focus state detection is observed, and sequentially monitoring, while observing charge accumulation for, each pair of blocks in a plurality of pairs of blocks that are set by dividing the pair of line sensors in a second pattern, and reading out the electrical signals from the each pair of blocks to the memory on condition that the electrical signals suitable for focus state detection is observed, wherein the monitoring of the plurality of pairs of blocks in the first pattern and the monitoring of the plurality of pairs of blocks in the second pattern are alternately repeated, and wherein the blocks in the second pattern includes boundaries of the blocks in the first pattern and the blocks in the first pattern includes boundaries of the blocks in the second pattern;
   a storage step of storing the sent electrical signals in the memory; and
   a focus detection step of detecting a focus state of the imaging lens on the object with each pairs of blocks as a focus detection point, on the basis of a phase difference between electrical signals of the pairs of the divided blocks stored in the memory.

8. The focus detection method according to claim 7 further comprising
   a generation step of generating electrical signals for one of the pair of line sensors from the electrical signals read out from the divided blocks of the one line sensor in the first and second patterns and stored in the memory.

9. The focus detection apparatus according to claim 1 further comprising a selection unit configured to select any of a plurality of predetermined focus detection points,
   wherein the focus detection unit detects the focus state of the imaging lens on the basis of a phase difference between electrical signals of the pair of blocks corresponding to the focus detection point selected by the selection unit among electrical signals stored in the memory.

10. The focus detection apparatus according to claim 1, wherein the positions of the focus detection points in the first pattern are different from the positions of the second detection points in the second pattern.

* * * * *